United States Patent
Unno (10) Patent No.: US 8,130,088 B2
(45) Date of Patent: Mar. 6, 2012

(54) VEHICLE CONTROLER FOR STRADDLE TYPE VEHICLE

(75) Inventor: Hitoshi Unno, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1452 days.

(21) Appl. No.: 11/419,390

(22) Filed: May 19, 2006

(65) Prior Publication Data

US 2006/0261673 A1 Nov. 23, 2006

(30) Foreign Application Priority Data

May 20, 2005 (JP) ................................. 2005-148596

(51) Int. Cl.
*B60R 25/10* (2006.01)
(52) U.S. Cl. .................................... 340/426.1; 307/10.1
(58) Field of Classification Search ................. 340/10.1, 340/426.11, 426.13; 307/10.1; 70/252
See application file for complete search history.

(56) References Cited

U.S. PATENT DOCUMENTS

| | | | |
|---|---|---|---|
| 4,486,806 A * | 12/1984 | Mochida et al. ............... | 361/172 |
| 4,853,504 A | 8/1989 | Tanaka et al. | |
| 4,941,854 A | 7/1990 | Takahashi et al. | |
| 5,157,389 A * | 10/1992 | Kurozu et al. .................. | 340/5.3 |
| 5,319,698 A | 6/1994 | Glidewell et al. | |
| 5,343,077 A | 8/1994 | Yoshida et al. | |
| 5,593,330 A | 1/1997 | Kobayashi | |
| 5,623,245 A | 4/1997 | Gilmore | |
| 5,725,228 A | 3/1998 | Livingston | |
| 5,854,736 A | 12/1998 | Fuhs et al. | |
| 5,860,842 A | 1/1999 | Parr | |
| 5,965,955 A | 10/1999 | Takanohashi | |
| 6,077,133 A | 6/2000 | Kojima et al. | |
| 6,125,782 A | 10/2000 | Takashima et al. | |
| 6,352,045 B1 | 3/2002 | Takashima | |
| 6,404,071 B1 | 6/2002 | Kurano | |
| 6,695,657 B2 | 2/2004 | Hattori | |
| 6,878,019 B2 | 4/2005 | Kanno et al. | |
| 6,889,654 B2 | 5/2005 | Ito | |
| 7,049,931 B2 | 5/2006 | Hayashi et al. | |

(Continued)

FOREIGN PATENT DOCUMENTS

DE 10125064 A1 11/2002

(Continued)

OTHER PUBLICATIONS

European Search Report; Sep. 11, 2006; two pages.

(Continued)

*Primary Examiner* — Vernal Brown
(74) *Attorney, Agent, or Firm* — Keating & Bennett, LLP (57) ABSTRACT

A vehicle controller for a straddle type vehicle includes a portable device that transmits a code signal and control unit comprising a receiver and an authenticator that respectively receive and authenticate the code signal. If the authentication is determined to be successful, a release signal is issued from a control unit to actuate a release structure of a steering lock to automatically release the steering lock. When a power source of the control unit is turned off, manual locking is allowed. Manual locking of the steering lock is actuated through a user's operation of a push-type locking switch. A manual lock structure is provided to manually lock the steering lock. The manual lock structure can be integrated with the automatic release structure that automatically releases the steering lock.

8 Claims, 5 Drawing Sheets

U.S. PATENT DOCUMENTS

| | | |
|---|---|---|
| 2002/0053310 A1 | 5/2002 | Ibata et al. |
| 2003/0089291 A1 | 5/2003 | Kanno et al. |
| 2004/0164850 A1 | 8/2004 | Konno et al. |
| 2004/0198106 A1 | 10/2004 | Tsumiyama et al. |
| 2004/0217897 A1 | 11/2004 | Hayashi et al. |
| 2004/0252014 A1 | 12/2004 | Emmerling et al. |
| 2005/0012590 A1 | 1/2005 | Metlitzky et al. |
| 2005/0029871 A1 | 2/2005 | Mori et al. |
| 2005/0234601 A1 | 10/2005 | Suzuki |
| 2006/0087177 A1 | 4/2006 | Hata |
| 2006/0261674 A1 | 11/2006 | Unno |
| 2006/0261675 A1 | 11/2006 | Unno |

FOREIGN PATENT DOCUMENTS

| | | |
|---|---|---|
| DE | 10203462 A1 | 7/2003 |
| EP | 1 069 012 A2 | 1/2001 |
| EP | 1108631 A | 6/2001 |
| EP | 1232918 A | 8/2002 |
| EP | 1504986 A | 2/2005 |
| EP | 1547912 A | 6/2005 |
| JP | 03021575 | 1/1991 |
| JP | 06247260 | 6/1994 |
| JP | 2001-254549 | 9/2001 |

OTHER PUBLICATIONS

Photograph of Safety Lanyard Cap and Float from 2001 Seadoo RXD1.

SeaDoo 2003 shop Manual; pp. 1-7; @Bombardier Inc. 2003.

Copending U.S. Appl. No. 10/909,938, filed Aug. 2, 2004, entitled "Control Device fro Small Watercraft".

* cited by examiner

VEHICLE CONTROLER FOR STRADDLE TYPE VEHICLE

CROSS-REFERENCE TO RELATED APPLICATIONS

This application claims the priority under 35 U.S.C. §119 (a)-(d) of Japanese Patent Application No. 2005-148596, filed on May 20, 2005, which is hereby incorporated by reference in its entirety.

BACKGROUND OF THE INVENTION

1. Field of the Invention

The present invention relates to a vehicle controller for a straddle type vehicle wherein the vehicle controller is adapted to perform an authentication function.

2. Description of the Related Art

For commonly used two-wheeled motor vehicles, engine start/stop and locking/unlocking of the steering have been performed by a mechanical key operation that involved inserting a key into a keyhole before key operation, which can be considered burdensome. Thus, a remote control system was proposed in which an owner of the vehicle would carry a portable transmitter (portable device) to transmit a signal to the vehicle to remotely control starting of the engine and unlocking of the steering system. This system would provide antitheft security by coding the signal transmitted to the vehicle and by authenticating the received encrypted signal with an authentication function installed on the vehicle.

Japanese Patent Document, JP-A-Hei 3-21575, disclosed a conventional authentication system. In this system, following successful authentication, a vehicle power circuit was switched-ON so that the engine could be started and so that the steering could be unlocked. An ignition switch and an unlocking switch could be manually operated once the power circuit was powered up and the two switches could start-up the engine and release the steering lock, respectively. In such a system, if authentication failed, the power circuit was not powered up. Thus, the engine would not start and the steering lock would not release the locked state. Thus, the system provided antitheft protection for the vehicle.

Japanese Patent Document, JP-A-Hei 6-247260, disclosed another authentication system. This system used a non-contact IC card. Upon successful authentication, the steering lock was released and the engine was able to be started. In this system, the engine enabling components and the steering lock release mechanism were all accommodated in a rigid steering lock unit, thereby preventing from engine start-up by an unauthenticated driver.

SUMMARY OF THE INVENTION

In the system described by Japanese Patent Document JP-A-Hei 3-21575, if authentication was successful, the engine start circuit and the unlock actuator, such as the steering lock, were able to be operated. But manual operation of the starting switch and manual operation of the release switch were necessary for engine start-up and release of the steering lock, respectively. Thus, in order to move the vehicle without starting the engine, such as during maintenance or the like, the steering lock must be manually operated to enable the vehicle to be steered after successful authentication. This manual unlocking can be burdensome, especially where several vehicles require movement. Also, locking of the steering lock required activation of the actuator, which resulted in the size of the actuator having to be increased in order to provide sufficient power to locking the steering lock. In other words, more torque was required to lock the steering lock that to unlock the steering lock.

In the system described by Japanese Patent Document JP-A-Hei 6-247260, if authentication was successful, the steering lock was released but the steering lock release was not controlled by the remote control. Thus, the system was less user-friendly than might be desired. In addition, locking of the steering lock was a manual operation, which removed the need for an enlarged actuator. Locking, however, was performed by rotary movement of a lever, which disadvantageously results in the need to provide adequate space for the range of lever movement.

One aspect of the present invention involves a vehicle controller for a straddle type vehicle comprising a portable device. The portable device is adapted to transmit a code signal. An authenticator is adapted to receive and authenticate the code signal. A release control unit is in electrical communication with a steering lock. The release control unit is adapted to issue a release signal to the steering lock if the code signal is successfully authenticated. The steering lock is adapted to automatically unlock a steering assembly in response to the release signal. Only when a power source for the vehicle controller is turned off, the steering lock is adapted to be manually locked through a push-type locking element.

Another aspect of the present invention involves a vehicle controller comprising a portable device, a control unit and a steering lock. The portable device adapted is to transmit a code signal. The control unit is in electrical communication with a power source and the steering lock. The control unit comprises a receiver and an authenticator. The receiver is adapted to receive the code signal and the authenticator is adapted to confirm that the received code signal identifies an approved portable device. The control unit provides a signal to the steering lock when the code signal is successfully authenticated. The steering lock comprises a lost motion linkage and a locking pin. A portion of the locking pin is adapted for manipulation by a user. The lost motion linkage is adapted to secure the locking pin in a locked position and an unlocked position so long as power is supplied by the power source and the lost motion linkage is adapted to secure the locking pin in only the locked position when power is not supplied by the power source.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

An embodiment of the present invention is described below with reference to the drawings. In the drawings and the following description, for the sake of simplifying explanation, components having substantially the same function are indicated with the same reference symbol. Further, the present invention is not limited to the following embodiment.

Figure 1:
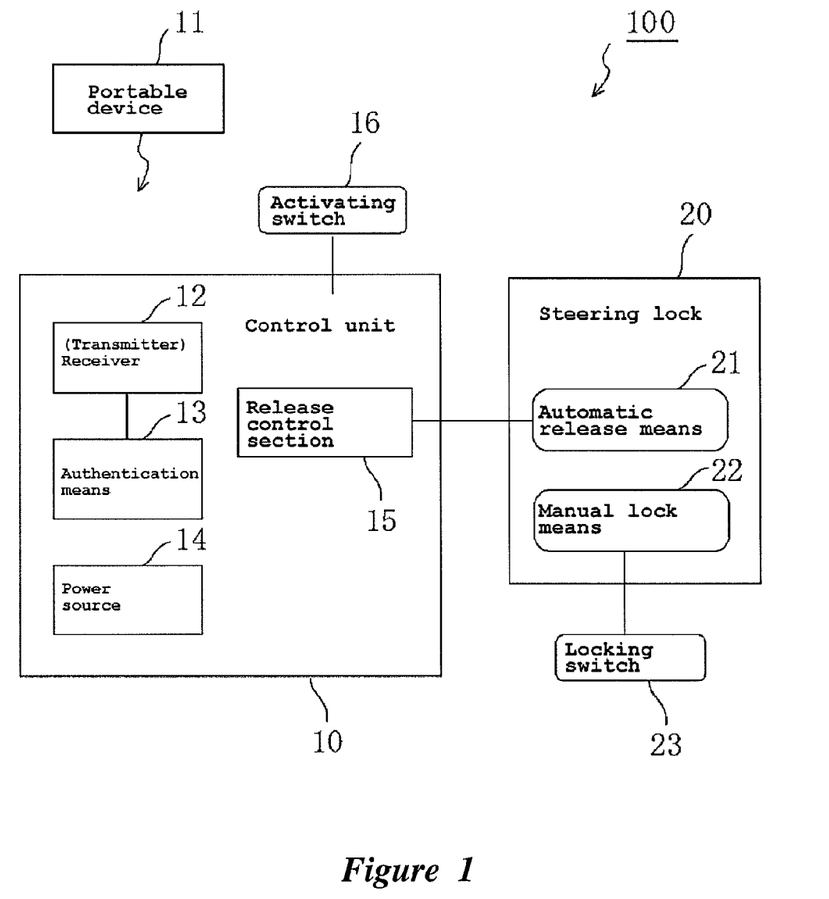
FIG. 1 is a block diagram illustrating a vehicle controller for a two-wheeled motor vehicle in which the controller is arranged and configured in accordance with certain features, aspects and advantages of the present invention.

FIG. 1 is a block diagram of a basic configuration of a vehicle controller 100 for a two-wheeled motor, which controller is arranged and configured in accordance with certain features, aspects and advantages of the present invention. Preferably, the vehicle controller 100 comprises an authentication system. In one configuration, the authentication system comprises a portable device 11 that a rider carries and a receiver 12. The portable device 11 transmits a code signal. The receiver 12 can be installed in or on the vehicle and the receiver preferably receives the code signal. An authenticator 13 identifies the received code signal to authenticate whether or not a rider is an authorized operator or an owner of the vehicle.

A non-contact IC card, a remote control switch or the like may be used as the portable device 11. For example, in the case of using the non-contact IC card, the code signal can be stored in the non-contact IC card in advance. The IC card can be brought close to the receiver 12 and the card emits the code signal, which is transmitted to the authenticator 13 so that the authenticator 13 can perform a code identification. If a remote control switch is used instead, a signal corresponding to the code signal (e.g. an infrared signal) can be transmitted by switch operation to the receiver 12, and then transmitted to the authenticator 13 for code identification.

In some configurations, an activating switch 16 may be provided in the vehicle. In such configurations, in response to operation of the activating switch 16, the transmitter-receiver 12 (i.e., the receiver 12 adapted to transmit as well) transmits a request signal, and in response to the request signal, the portable device 11 transmits a code signal. Thus, the rider can operate the activating switch, which is attached to the vehicle, while keeping the portable device 11 in his/her pocket or the like and the portable device 11 then authenticates the rider, thereby providing improved usability compared to the non-contact IC card or the remote control switch. In other configurations, the vehicle may constantly transmit a code signal instead of transmitting a request signal.

In the above authentication system, when code identification is successful, a release signal is issued from a release control section 15 of a control unit 10 to cause a steering lock 20 to actuate an automatic release actuator 21 to automatically release the steering lock 20.

When a power source 14 of the control unit 10 is turned off, manual locking of the steering lock 20 is allowed. Operation of a locking switch 23 causes manual locking of the steering lock 20. The control unit 10 issues a locking enabling signal to the steering lock 20 and receives a signal indicating that locking is allowed from the steering lock 20 to turn the power source 14 off. The locking switch 23 advantageously is a push switch, which reduces the space needed for operation (e.g., no rotation of a lever is required). Thus, the push switch provides greater layout flexibility of the locking switch 23.

Figure 2:
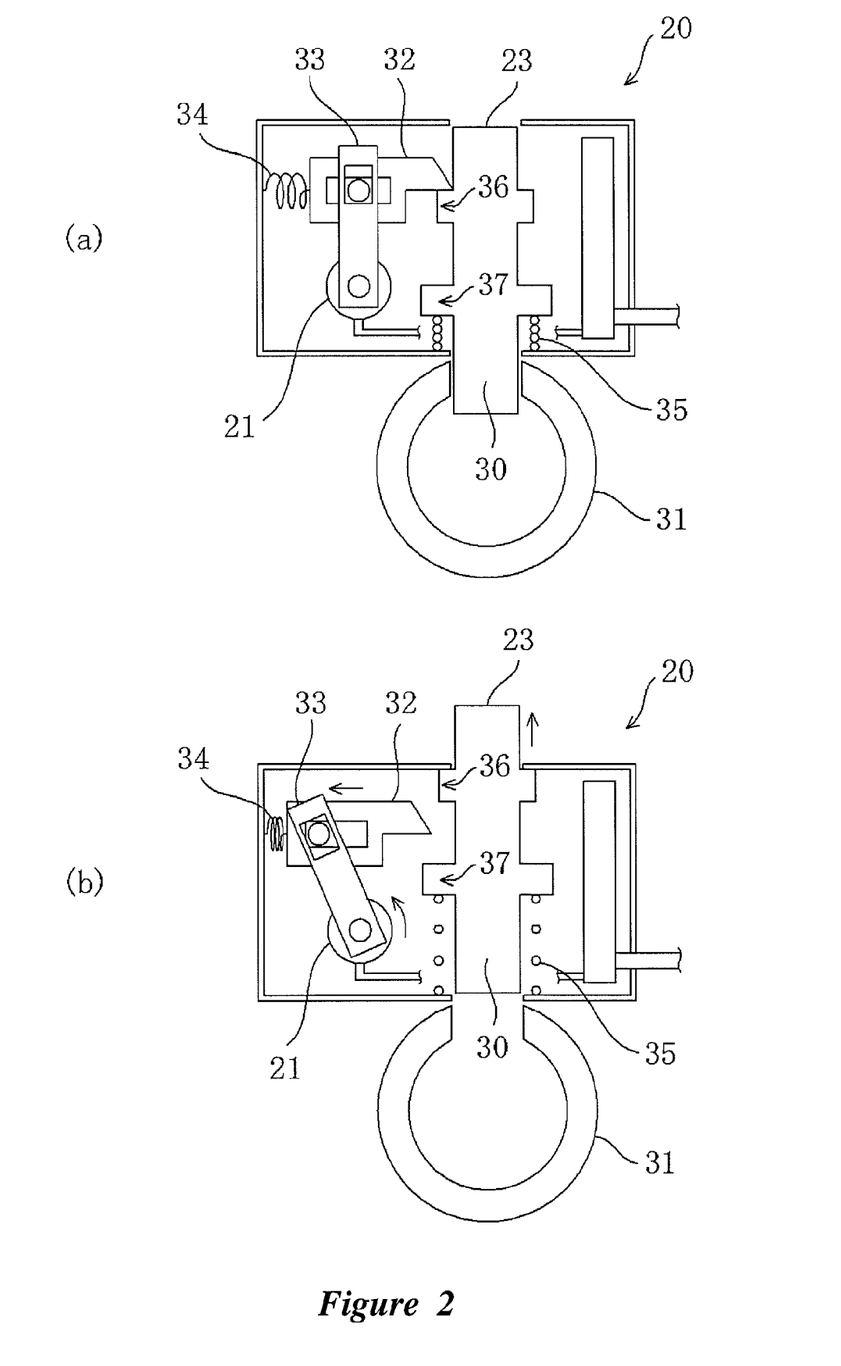
FIGS. 2(a) and 2(b) are schematic views of a steering lock arranged and configured in accordance with certain features, aspects and advantages of the present invention.
Figure 3:
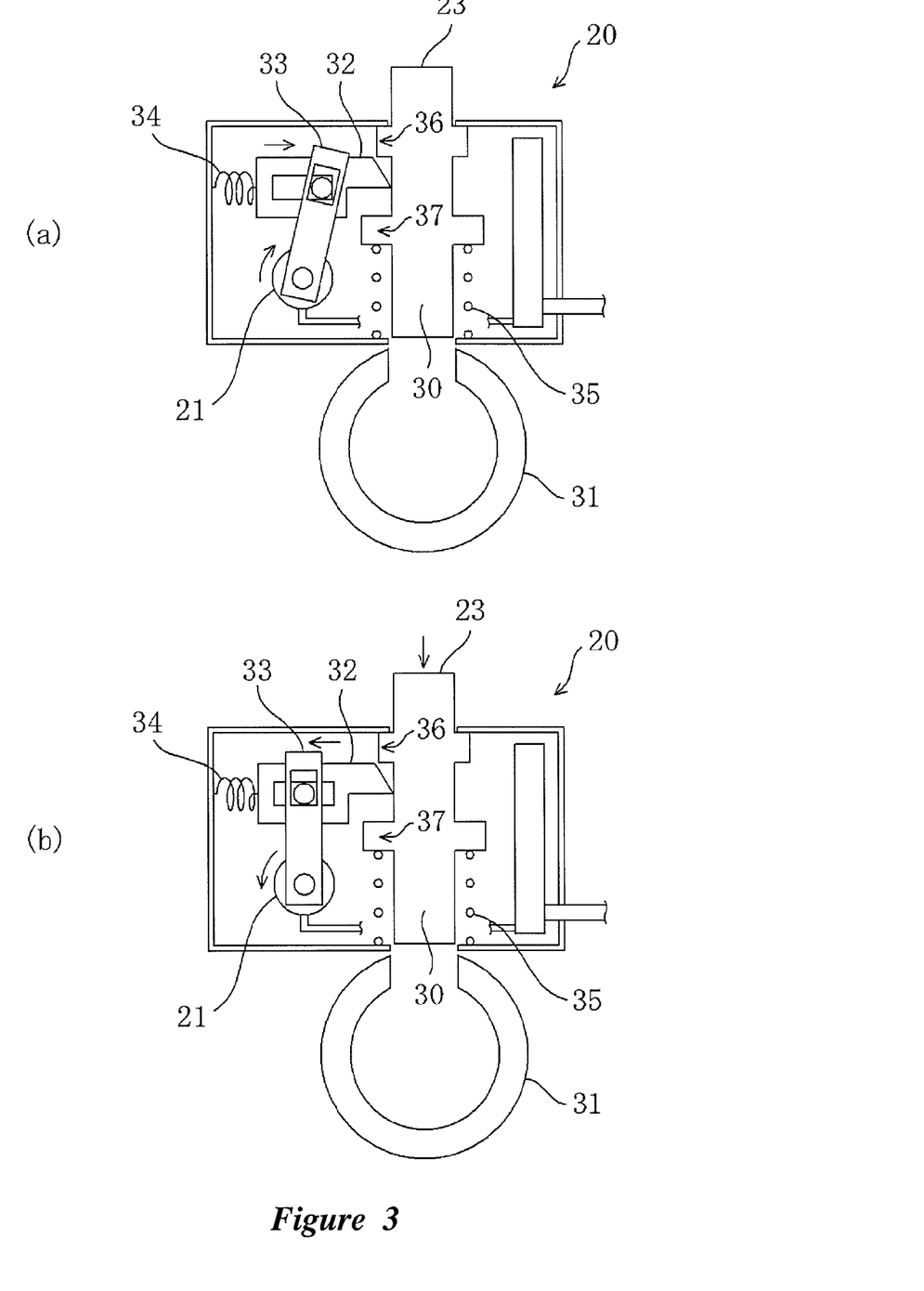
FIGS. 3(a) and 3(b) are more schematic views of the steering lock arranged and configured in accordance with certain features, aspects and advantages of the present invention.

With reference now to FIGS. 2 and 3, a method of controlling the automatic release and manual locking of the steering lock 20 will be described. FIG. 2(a) is a schematic view of the steering lock 20 in a locked state. In the illustrated configuration, the locking switch 23, which advantageously is configured as a push button, also serves as a lock pin (e.g., a manual lock element) 30. In other words, in the illustrated configuration, one end of the lock pin 30 defines the locking switch 23. Preferably, the handlebars 31 are locked with a distal end of the lock pin 30 engaged with or positioned within a recess of the handlebars 31 and with a distal end of a sliding retention member 32 engaged with a projection 36 of the lock pin 30. More preferably, a spring 34 urges the end of the lock pin 30 into a gap at least partially defined by the projection 36.

When the authenticator 13 determines authentication to be successful, a release control section 15 issues a steering lock release signal, activating the actuator 21 to pivot in the direction of the arrow as shown in FIG. 2(b). The actuator 21 is coupled to a link mechanism 33. For reasons that will be discussed, the link mechanism 33 preferably has some degree of lost motion. As the actuator 21 pivots, the link mechanism 33 moves along a groove of the slider 32 in the direction opposite to the lock pin 30, bringing the slider 32 out of engagement with the projection of the lock pin 30. This brings the lock pin 30 out of engagement with the recess of the handlebars 31 due to an urging force of a spring 35, thereby automatically releasing the steering lock 20.

When automatic release of the steering lock 20 has been detected (e.g., the position of the lock pin 30 has been detected), the actuator 21 pivots in the direction of the arrow as shown in FIG. 3(a), moving the link mechanism 33 in the direction of the lock pin 30. In addition to the spring 34, the link mechanism 33 in the illustrated configuration can assist in moving the slider 32 into engagement with the projection 36 of the lock pin (i.e., moving the end of the slider 32 into a gap at least partially defined by the projection 36). The link mechanism 33 is in contact with an end of the groove of the slider 32 in this state, and therefore the slider 32 cannot move in the direction opposite to the lock pin 30. It is thus impossible to press the locking switch 23 into the recess of the handlebars 31. In other words, once the steering lock 20 is automatically released, the steering lock 20 preferably is kept in the state where manual locking is not allowed. Any accidental operation of the locking switch during riding by the rider, therefore, should not result in locking of the steering lock 20. In the illustrated configuration, the rider cannot operate the locking switch in this state due to the influence of the link mechanism 33.

When the power source 14 of the control unit 10 is turned off, the actuator 21 pivots in the direction of the arrow as shown in FIG. 3(b), moving the link mechanism 33 toward a center part of the groove of the slider 32. Pressing the locking switch 23 from this state causes the projection 36 of the lock pin 30 to retract the slider 32 because the distal end of the slider 32 is inclined. When the projection 36 of the lock pin 30 passes the position of the distal end of the slider 32, the slider 32 is pushed back in the direction of the lock pin by an urging force of the spring 34 to return to the locking state as shown in FIG. 2(a).

In the manner described above, the steering lock 20 is automatically released when the power source 14 of the control unit 10 is turned on. Once the steering lock 20 is automatically released, the steering lock 20 unlikely to be manually locked. When the power source 14 of the control unit 10 is turned off, manual locking is allowed.

If authentication of a signal transmitted from the portable device 11 is successful, the power source 14 of the control unit 10 of the vehicle is turned on and the steering lock 20 is released. This allows the rider to move the vehicle without starting an engine, facilitating maintenance and other work. When the power source 14 of the control unit 10 of the vehicle is turned off, the steering lock 20 can be manually locked. Thus, a smaller actuator can be used to release the steering lock 20.

Once the steering lock 20 is automatically released, the steering lock 20 preferably is generally prevented from manual locking. Any accidental contact with the locking switch during operation of the vehicle, therefore, does not result in locking of the steering lock 20. Further, as shown in FIGS. 2 and 3, the integrated construction of the manual lock pin 30 and the actuator 21 can reduce the size of a release/lock device for the steering lock 20.

Figure 4:
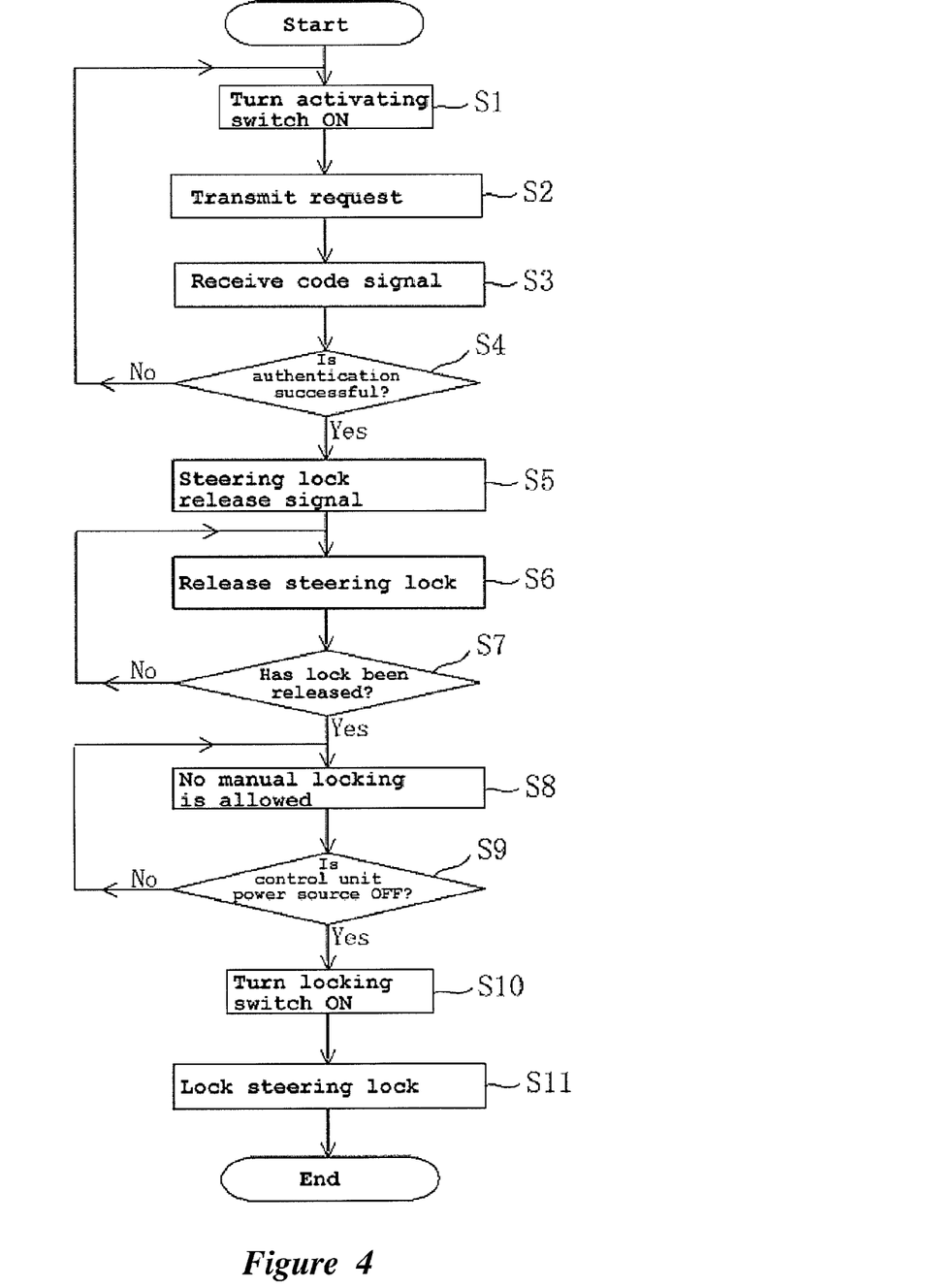
FIG. 4 is a flow chart illustrating a vehicle control method using the vehicle controller of FIG. 1.

With reference to the flowchart of FIG. 4, an exemplary vehicle control method that is implemented with the vehicle controller 100 of FIG. 1 will be described. Initially, a rider operates the activating switch 16 provided on the vehicle (S1) to issue a request signal from the transmitter-receiver 12 provided on the vehicle (S2). Upon reception of the request signal, the portable device 11, which the rider carries, sends a code signal back automatically. The transmitter-receiver 12 provided on the vehicle receives the code signal (S3) and identifies the signal with a specific reference code preset by the authenticator 13 (S4).

When the authentication succeeds, the release control section 15 of the control unit 10 issues a release signal (S5) to automatically release the steering lock 20 (S6). These conditions allow the rider to move the vehicle, so that the rider can start vehicle inspection, maintenance or other work immediately. It should be understood that if the authentication fails, the steering lock 20 remains locked, thus providing antitheft protection for the vehicle.

When the steering lock 20 has been released, the engine can be started. If the steering lock 20 is determined to have been released (S7), the steering lock 20 is maintained in an unlocked position (S8). Accordingly, manual locking of the illustrated steering lock 20 during riding is generally prevented.

When the vehicle comes to a stop after operation, the engine is stopped and the power source of the control unit is turned to an off state (S9), the steering lock 20 is released from the unlocked state. When the rider operates the locking switch 23 (S10), the steering lock 20 is manually locked.

Figure 5:
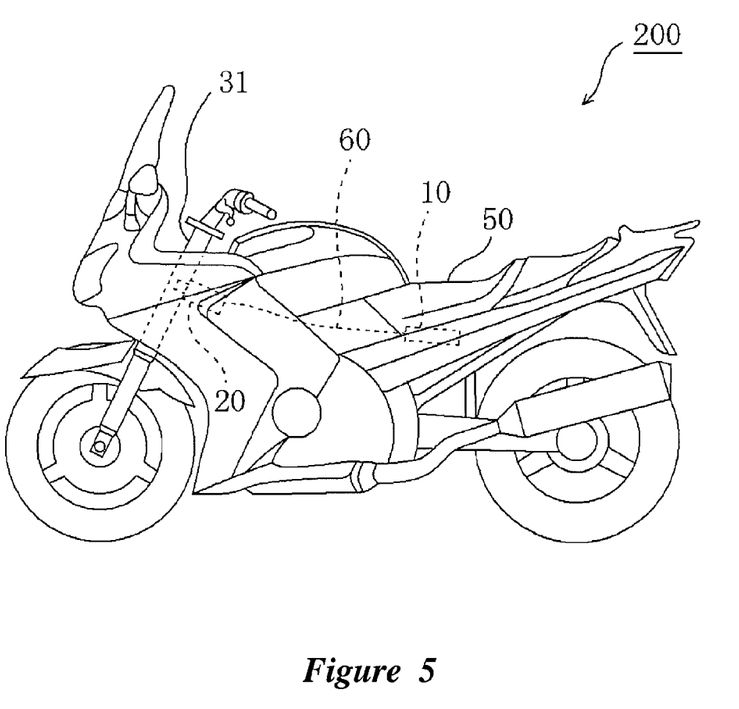
FIG. 5 illustrates an example in which the vehicle controller has been mounted to a vehicle.

With reference to FIGS. 1 to 4, the description has been made above for the feature of the configuration of the vehicle controller 100 for a two-wheeled motor vehicle according to the invention. In turn, FIG. 5 illustrates an example in which the vehicle controller 100 is installed on a two-wheeled motor vehicle 200.

In the vehicle controller, the control unit 10 and the steering lock 20 may be separately mounted, which can improve layout flexibility in the vehicle. In the example illustrated in FIG. 5, the control unit 10 is located below a seat 50 while the steering lock 20 is located adjacent to handlebars 31. The steering lock 20 preferably is coupled to the control unit 10 via wiring 60. Other configurations (e.g., wireless) also are possible. Thus, in response to a release signal from the release control section 15 of the control unit 10, the steering lock 20 is automatically released. Operation of the locking switch 23 disposed adjacent to or integral with the steering lock 20 actuates the manual lock means 22 of the steering lock 20, so that the steering lock 20 is manually locked.

For triggering of authentication through rider's operation of the activating switch 16, the activating switch 16 is preferably disposed in the place offering good operability to the rider (e.g. near a speed meter). In the case where the activating switch 16 is a push switch similar to the locking switch 23 of the steering lock 20, activation of the authentication system and manual locking of the steering lock 20 are achieved through common operation of "Pressing," providing improved operability.

Further, in the case where the activating switch 16 has the constitution of a two-stage push switch, turning-off operation of the power source of the control unit 10, as well as triggering of authentication can be achieved with the same switch, providing further improved operability. In this case, the activating switch 16 should be set such that for short pressing (first pressing operation), triggering of authentication is activated and for long pressing (second pressing operation), the power source of the control unit 10 is turned off.

While the term "two-wheeled motor vehicle" used herein comprises a motorcycle, including motorbikes and motor scooters. The term has its ordinary meaning and also means any vehicle which can be turned by tilting the vehicle body. Thus, a vehicle equipped with two or more front wheels and/or two or more rear wheels, thus having three or four (or more) wheels in total can be considered an "autobicycle."

Without any limitation to motorcycles, the present invention may also be applied to other vehicles, as long as a vehicle can take advantage of effects of the invention. This includes any straddle type vehicles, such as four-wheeled buggies or all terrain vehicles (ATV) and snowmobiles.

Although the present invention has been described in terms of certain embodiments and implementations, other embodiments and implementations apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vehicle controller for a straddle type vehicle comprising:
    a steering lock including a push-type locking element that locks a steering assembly, and
    a control unit including:
        a portable device, the portable device programmed to transmit a code signal,
        an authenticator programmed to receive and authenticate the code signal,
        a release control unit in electrical communication with the steering lock, wherein
    the release control unit issues a release signal to the steering lock if the code signal is successfully authenticated,
    the steering lock automatically unlocks the steering assembly in response to the release signal, and
    the steering lock locks the steering assembly in response to an operation of the push-type locking element only if a power source for the control unit is turned off.

2. The vehicle controller for a straddle type vehicle according to claim 1, wherein the push-type locking element and an automatic release construction are integrated together.

3. The vehicle controller for a straddle type vehicle according to claim 1, wherein once the steering lock is automatically released, the push-type locking element is not capable of operation until the power source of the control unit is turned off.

4. The vehicle controller for a straddle type vehicle according to claim 1, wherein the code signal transmitted from the portable device is transmitted in response to a request signal transmitted in response to user's operation of an activating switch provided in the vehicle, and wherein the activating switch is a push switch.

5. The vehicle controller for a straddle type vehicle according to claim 4, wherein the activating switch comprises a two-stage push switch and the request signal is transmitted from the vehicle in response to a first pressing operation and the power source is turned off in response to a second pressing operation.

6. A straddle type vehicle incorporating the vehicle controller for a straddle type vehicle according to anyone of claim 1.

7. A vehicle controller comprising a portable device, a control unit and a steering lock, the portable device adapted to transmit a code signal, the control unit being in electrical communication with a power source and the steering lock, the control unit comprising a receiver and an authenticator, the receiver being adapted to receive the code signal and the authenticator being adapted to confirm that the received code signal identifies an approved portable device, the control unit providing a signal to the steering lock when the code signal is successfully authenticated, the steering lock comprising a lost motion linkage and a locking pin, a portion of the locking pin being adapted for manipulation by a user, the lost motion linkage adapted to secure the locking pin in a locked position and an unlocked position so long as power is supplied by the power source and the lost motion linkage adapted to secure the locking pin in only the locked position when power is not supplied by the power source.

8. The vehicle controller of claim 7, wherein the portion of the locking pin defines a push-button at one end of the locking pin and the other pin interacts with a portion of a steering assembly of a vehicle.

* * * * *